United States Patent
Sugimasa et al.

(10) Patent No.: US 7,226,690 B2
(45) Date of Patent: *Jun. 5, 2007

(54) CATALYST MATERIAL AND METHOD OF MANUFACTURING THE SAME AND FUEL CELL USING THE SAME

(75) Inventors: Masatoshi Sugimasa, Hitachi (JP); Takeyuki Itabashi, Hitachi (JP); Haruo Akahoshi, Hitachi (JP); Hiroshi Yoshida, Mito (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/076,954

(22) Filed: Mar. 11, 2005

(65) Prior Publication Data

US 2005/0158611 A1 Jul. 21, 2005

Related U.S. Application Data

(62) Division of application No. 10/912,089, filed on Aug. 6, 2004.

(30) Foreign Application Priority Data

Aug. 8, 2003 (JP) ............................. 2003-206660
Jun. 29, 2004 (JP) ............................. 2004-190638

(51) Int. Cl.
 *H01M 4/86* (2006.01)
 *H01M 4/96* (2006.01)
 *H01M 8/10* (2006.01)
 *B01J 21/18* (2006.01)

(52) U.S. Cl. ............................. 429/40; 429/30; 429/44; 502/180; 502/185

(58) Field of Classification Search .................. 429/30, 429/40, 44; 502/101, 180, 185
See application file for complete search history.

(56) References Cited

U.S. PATENT DOCUMENTS 6,284,213 B1 * 9/2001 Paparatto et al. ............ 423/403
6,380,126 B1 * 4/2002 Finkelshtain et al. ....... 502/159
2005/0233183 A1 * 10/2005 Hampden-Smith et al. ... 429/12

FOREIGN PATENT DOCUMENTS

| JP | 2001-342377 | 12/2001 |
| JP | 2002-1095 | 1/2002 |
| JP | 2002-305000 | 10/2002 |
| JP | 2002305000 A * | 10/2002 |
| JP | 2003-093874 | 4/2003 |

* cited by examiner

*Primary Examiner*—Gregg Cantelmo
(74) *Attorney, Agent, or Firm*—Antonelli, Terry, Stout & Kraus, LLP.

(57) ABSTRACT

To use a catalyst material, which has a functional group that covalently binds to a catalyst metal particle on the surface of a catalyst carrier, and a catalyst metal particle that covalently binds to the functional group, for a fuel cell.

15 Claims, 12 Drawing Sheets

CROSS-SECTIONAL VIEW
TAKEN ALONG A-A LINE

CROSS-SECTIONAL VIEW
TAKEN ALONG B-B LINE

CROSS-SECTIONAL VIEW
TAKEN ALONG A-A LINE

CROSS-SECTIONAL VIEW TAKEN ALONG A-A LINE

CROSS-SECTIONAL VIEW
TAKEN ALONG A-A LINE

CROSS-SECTIONAL VIEW
TAKEN ALONG A-A LINE

CROSS-SECTIONAL VIEW
TAKEN ALONG A-A LINE

CATALYST MATERIAL AND METHOD OF MANUFACTURING THE SAME AND FUEL CELL USING THE SAME

This application is a Divisional application of prior application Ser. No. 10/912,089, filed Aug. 6, 2004, the contents of which are incorporated herein by reference in their entirety.

BACKGROUND OF THE INVENTION

The present invention relates to a fuel cell in which liquid fuel is oxidized on the anode which is a component of a membrane electrode assembly (MEA) consisting of an electrode catalyst, anode, electrolyte membrane, cathode, and a diffusion layer, and then oxygen is reduced on the cathode.

In a conventional secondary cell, the cell must be charged after a constant amount of electric power has been used, which requires a charging device as well as a relatively long charging time. Accordingly, there are some problems in continuously operating mobile devices for a long period of time at any time and any place. In the future, mobile devices will require a power source which has high power density and high energy density, that is, a power source which can be continuously operated for a long period of time, in order to quickly process an increasing amount of information and achieve highly advanced functions. Thus, there are increasing needs for a compact power generator which does not need to be charged, that is, a micro power generator which can be easily supplied with fuel.

In the light of such circumstances, a fuel cell power source is considered to be a response to remedy the aforementioned request. The basic fuel cell at least consists of a solid or liquid electrolyte, two electrodes which induce desired electrochemical reaction, an anode, and a cathode. The fuel cell is a power generator which efficiently converts fuel's chemical energy directly into electrical energy by the action of an electrode catalyst. Hydrogen which has been chemically converted from fossil fuel or water, methanol which is a liquid or solution in a normal environment, alkali hydride, hydrazine, or dimethyl ether which is a pressurized liquefied gas are used as a fuel, and air or oxygen gas is used as an oxidizing gas.

A fuel is electrochemically oxidized on the anode and oxygen is reduced on the cathode, which generates an electrical potential difference between those two electrodes. If, at this point, an external circuit load is applied between the two electrodes, ion transfer occurs in the electrolyte, and consequently, electrical energy is supplied to the external load.

Of all fuel cells, a direct methanol fuel cell (DMFC) which uses liquid fuel, and metal hydride or hydrazine fuel cells are considered effective as a small and portable or mobile power source because those fuels' volume energy density is high. Especially, the DMFC which utilizes methanol as a fuel is considered an ideal power supply system because methanol is easily handled and is expected in the future to be produced from biomass.

Japanese Laid-open Patent Publication No. 2002-1095, No. 2002-305000 and No. 2003-93874 aim to increase performance of the above-mentioned electrode catalyst.

SUMMARY OF THE INVENTION

To increase performance of an electrode catalyst, it is necessary to prevent catalyst particles from cohering to one another and keep the particles small, and to increase the specific surface area. Currently, the most popular small particle manufacturing method is to coat the particle surface using a protective agent to prevent cohesion. However, there is a problem with this method because a catalytic reaction progresses on the active site on the surface of the particle, and if the catalyst metal surface is covered with a protective agent, the level of the catalytic activity decreases.

The objectives of the present invention are to provide a catalyst material having catalyst metal particles with a high specific surface area, and also to provide a fuel cell which has high power density as the result of using the catalyst metal for a membrane electrode assembly incorporated in the fuel cell.

A catalyst material, which has a functional group that covalently binds to a catalyst metal particle on the surface of a catalyst carrier, and a catalyst metal particle that covalently binds to the functional group, is used for a fuel cell.

DETAILED DESCRIPTION OF THE PREFERRED EMBODIMENTS

Hereafter, preferred embodiments of the present invention will be described, however, the present invention is not intended to be limited to the following embodiments. In the following embodiments, methanol is used as a fuel, but hydrogen or a gas which contains hydrogen can be used.

In a fuel cell 1 of this embodiment which uses methanol as a fuel, chemical energy derived from methanol is directly converted into electrical energy as a result of the electrochemical reaction shown below, thereby generating electric power. On the anode side, a supplied methanol solution reacts according to Equation 1 and dissociates into carbon dioxide, hydrogen ion and electron (oxidation of methanol).

$$CH_3OH + H_2O \rightarrow CO_2 + 6H^+ + 6e^- \quad (1)$$

The generated hydrogen ion moves from the anode side to the cathode side in the electrolyte membrane, and reacts on the cathode electrode with oxygen gas which has been diffused from the air and electron on the electrode according to Equation 2, thereby generating water (reduction of oxygen).

$$6H^+ + 3/2O_2 + 6e^- \rightarrow 3H_2O \quad (2)$$

Total chemical reactions associated with power generation are shown in Equation 3 in which methanol is oxidized by oxygen, thereby generating carbon dioxide and water. The chemical equation is the same as that of the combustion of methanol.

$$CH_3OH + 3/2O_2 \rightarrow CO_2 + 3H_2O \quad (3)$$

Hereafter, examples of a fuel cell according to this embodiment will be explained in detail.

Figure 1:
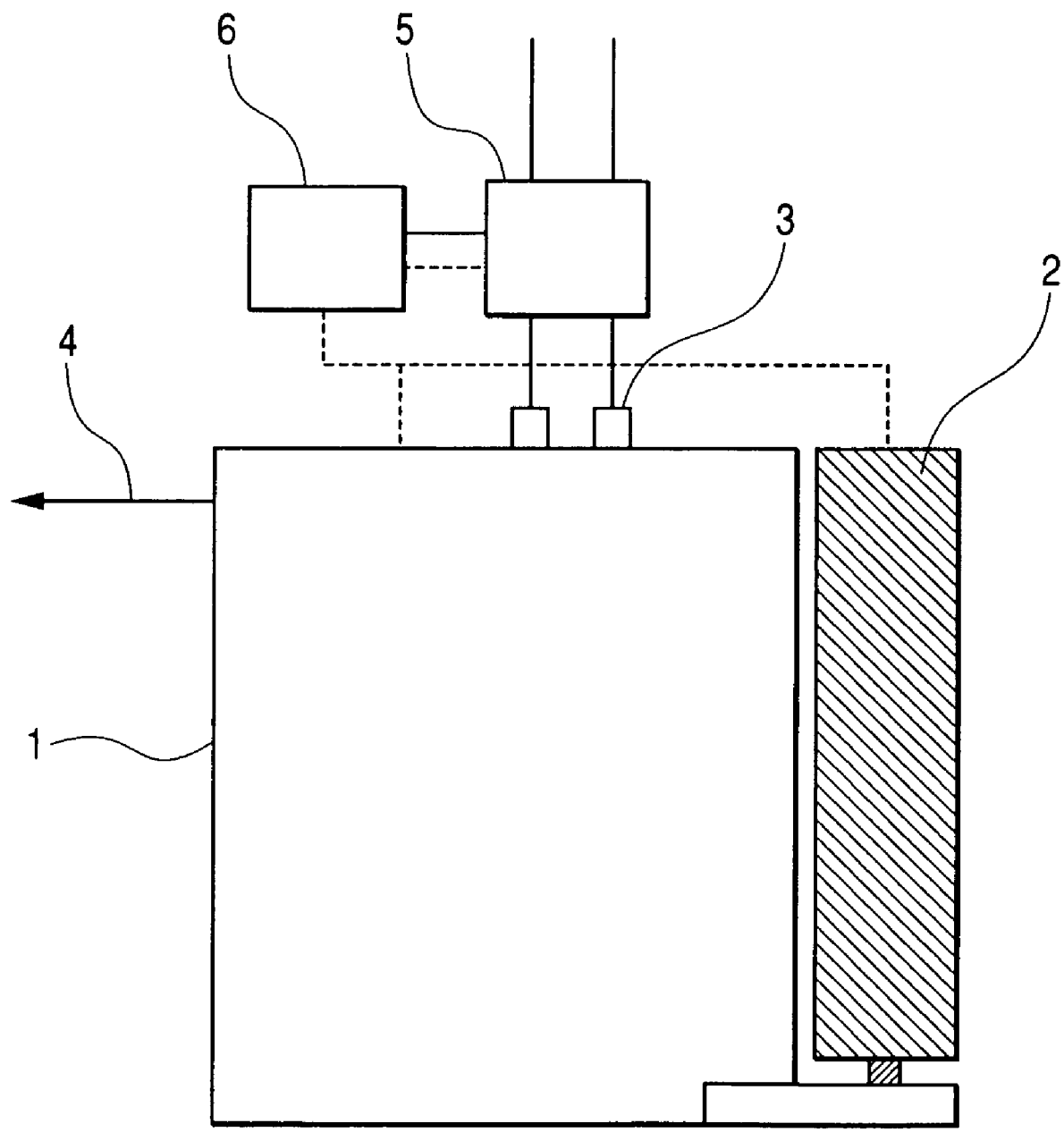
FIG. 1 shows an embodiment of a fuel cell power supply system according to the present invention.
Figure 2:
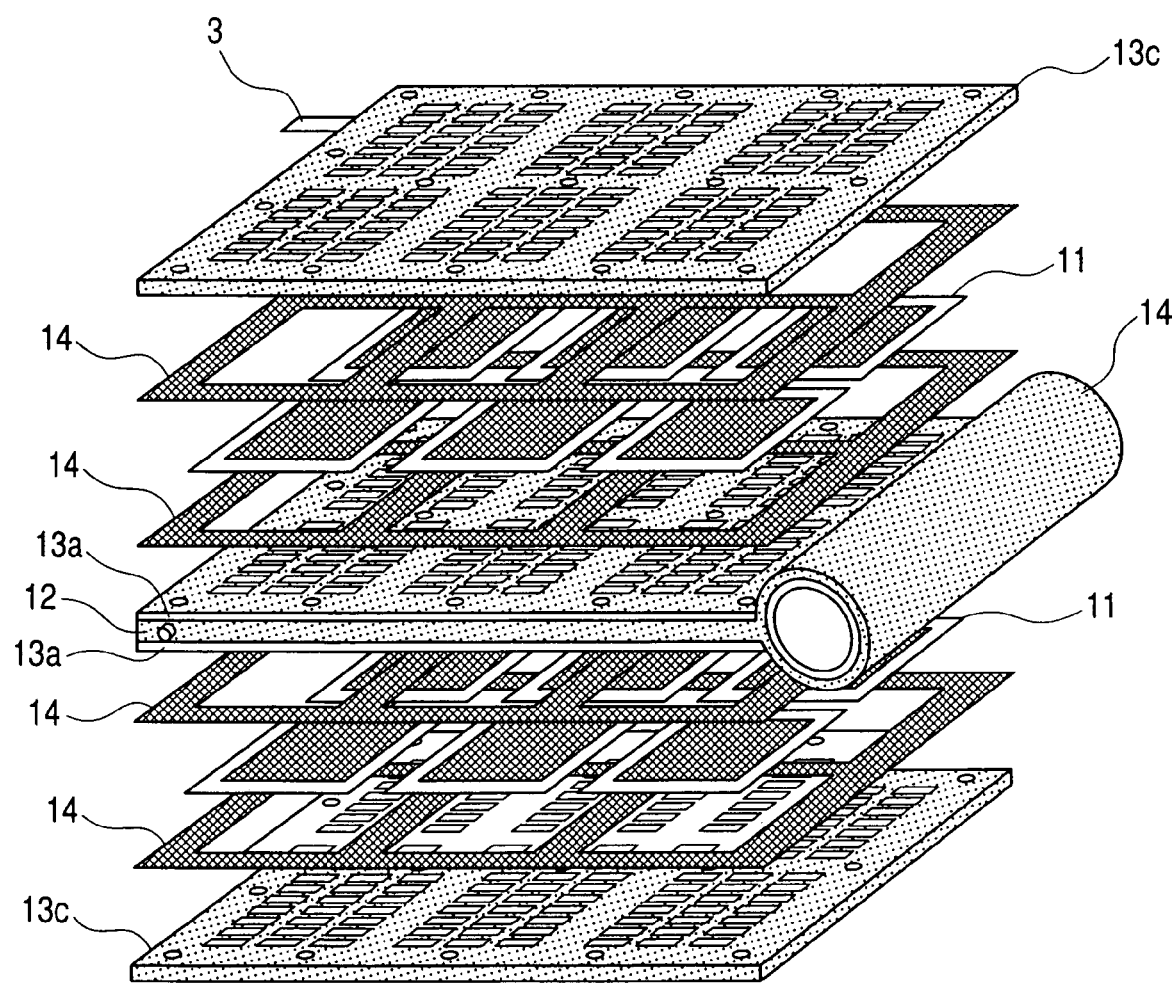
FIG. 2 shows an embodiment of a fuel cell according to the present invention.

FIG. 1 shows the configuration of a power supply system according to this embodiment. The power supply system consists of a fuel cell 1, fuel cartridge tank 2, output terminal 3 and an exhaust-gas outlet 4. The exhaust-gas outlet 4 is created to discharge carbon dioxide generated on the anode side from a fuel chamber 12 (FIG. 2). The fuel cartridge tank 2 pumps out a fuel by means of pressure of a high-pressure liquefied gas, high-pressure gas, or spring to supply fuel to the fuel chamber 12 disclosed in FIG. 2, and keeps the liquid fuel pressure in the fuel chamber higher than the atmospheric pressure. As a certain amount of fuel in the fuel chamber 12 is consumed when electric power is generated, the same amount of fuel is replenished from the pressurized fuel cartridge 2. The battery output system supplies electric power to load equipment via a DC/DC converter 5. The power supply system is equipped with a controller 6 which controls the DC/DC converter 5 by receiving signals according to the fuel level of the fuel cell 1 and fuel cartridge tank 2 and operating conditions of the DC/DC converter 5, thereby outputting a warning signal if necessary. If necessary, the controller 6 is also able to display operating conditions of the power source, such as battery voltage, output current, and battery temperature, on the load equipment, and if the amount of fuel in the fuel cartridge tank 2 becomes less than a prescribed level, or if the amount of air diffusion is out of the prescribed range, the controller 6 stops supplying electric power from the DC/DC converter 5 to the load equipment and activates an audible warning signal, vocal warning, pilot lamp or character warning display. It is also possible to display fuel level on the load equipment during normal operation by receiving a signal indicating the fuel level in the fuel cartridge tank 2.

FIG. 2 shows the configuration of fuel cell components according to an embodiment of the present invention. In the fuel cell 1, an anode end plate 13*a*, gasket 17, MEA 11 with diffusion layer, gasket 17, and a cathode end plate 13*c* are sequentially laminated on one side of the fuel chamber 12 having a fuel cartridge holder 14, and on the other side of the fuel chamber 12, an anode end plate 13*a*, gasket 17, MEA with diffusion layer 11, gasket 17, and a cathode end plate 13*c* are sequentially laminated, and those laminates are securely integrated with screws 15 (FIG. 3) so that the pressurizing force on the laminated body is almost uniform.

Figure 3:
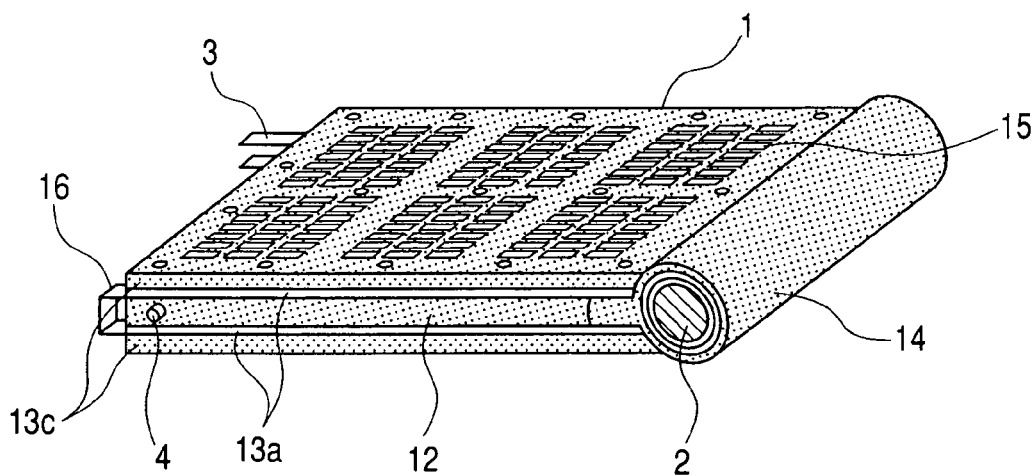
FIG. 3 is a schematic view showing a fuel cell power source having a cartridge holder according to the present invention.

FIG. 3 is a schematic view showing the fuel cell 1 having a power generating portion which is created such that six MEAs 11 with diffusion layer are plamimetrically laminated on both sides of the laminated fuel chamber. In the fuel cell 1, a plurality of single cells are connected in series on both sides of the fuel chamber 12, and those two serially connected cell groups on both sides are also connected to each other in series via the connection terminal 16, thereby outputting electric power from the output terminal 3.

Figure 5:
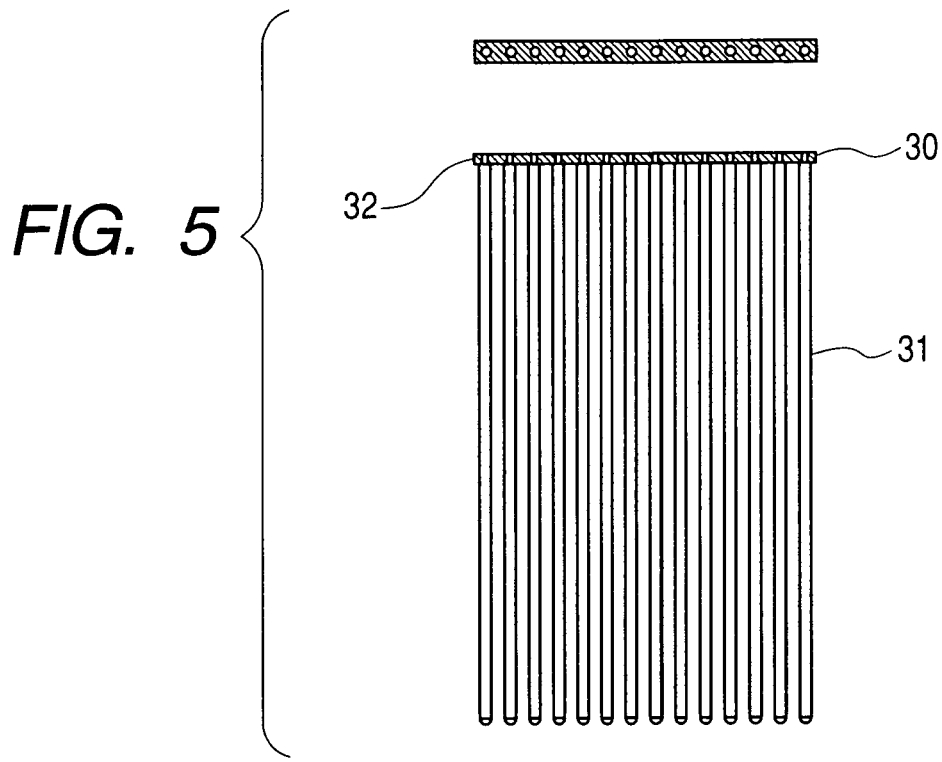
FIG. 5 shows an embodiment of an exhaust-gas discharge module according to the present invention.

In FIG. 3, fuel is pumped from the fuel cartridge tank 2 by means of a high-pressure liquefied gas, high-pressure gas, or spring, and carbon dioxide generated on the anode is discharged from an exhaust-gas outlet 4 via an exhaust-gas discharge module 30, not shown in FIG. 3 but shown in FIG. 5 as an embodiment. The exhaust-gas discharge module 30 has a vapor-liquid separation function to collect exhaust gas. On the other hand, air used as an oxidizing agent is supplied by diffusing through an air diffusion slit 22*c*, and water generated on the cathode is diffused and discharged through this slit 22*c*. The method to fasten to integrate the battery configuration is not intended to be limited to the use of screws as disclosed in this embodiment. An alternative method to fit the battery is to insert the battery onto a portion of the chassis that will securely retain the battery as the result of compressive force. Other alternatives may also be applied.

Figure 4:
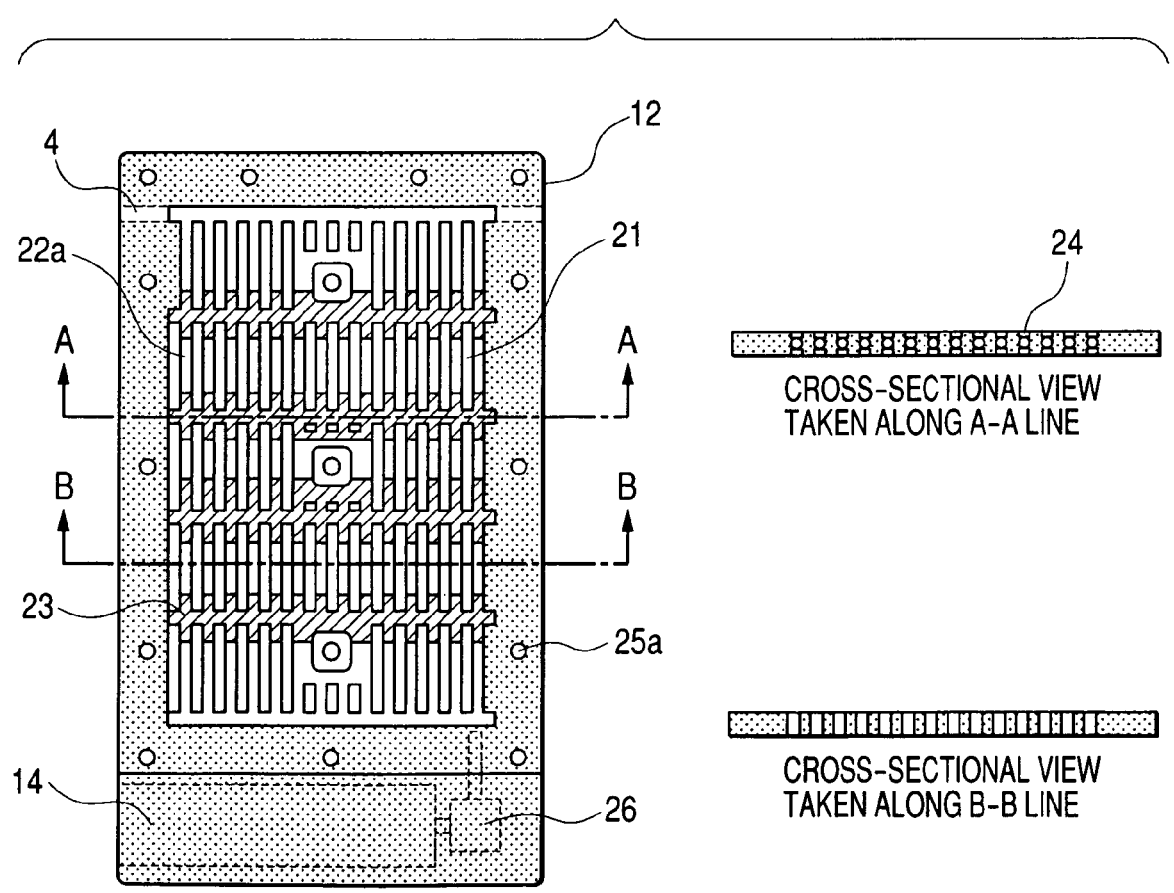
FIG. 4 shows an embodiment of a fuel chamber according to the present invention.

FIG. 4 shows the configuration of a fuel chamber 12 according to an embodiment of the present invention. The fuel chamber 12 has a plurality of ribs 21 for distributing fuel, and ribs 21 are supported by a rib support plate 23 thereby forming penetrating slits 22*a*. The rib support plate 23 is thinner than the fuel chamber 12, and has grooves for distributing fuel. The rib support plate 23 also has a support hole 24 to support a vapor-liquid separation tube 31 which is disclosed in FIG. 5. The fuel chamber 12 also has an exhaust-gas outlet 4, battery securing screw holes 25*a*, a fuel cartridge receiving port 26, and a fuel cartridge holder 14. Material for the fuel chamber 12 is not intended to be limited to a specific material as far as the material is smooth to allow uniform surface pressure to be applied to the MEA and is also insulated so that a plurality of cells installed thereon do not mutually short-circuit. High-density vinyl chloride, high-density polyethylene, high-density polypropylene, epoxy resin, polyether ether ketone, polyether sulfone, polycarbonate, or such materials reinforced with glass fiber can be used. Also, carbon plate, steel, nickel, other light-weight aluminum or magnesium alloy material, or, intermetallic compound, typified by copper-aluminum, and a variety of stainless steels can be used by applying techniques to make the surface of such material nonconductive or have insulating properties by the application of resin.

In FIG. 3, slits 22*a* for distributing fluid, such as a fuel or oxidizing gas, are parallel grooves. However, the configuration is not intended to be limited to the parallel grooves; other configurations can be selected as far as the configuration allows the fluid to be uniformly distributed on the surface. Also in FIG. 3, fuel cell components are uniformly screwed to provide a secure electrical contact as well as to seal liquid fuel. However, this embodiment is not the only possible configuration. For example, fuel cell components can be bonded together with adhesive high polymer films and the fuel cell can be securely pressurized by means of a chassis. This method is effective to make the power source light-weight and thin.

Figure 6:
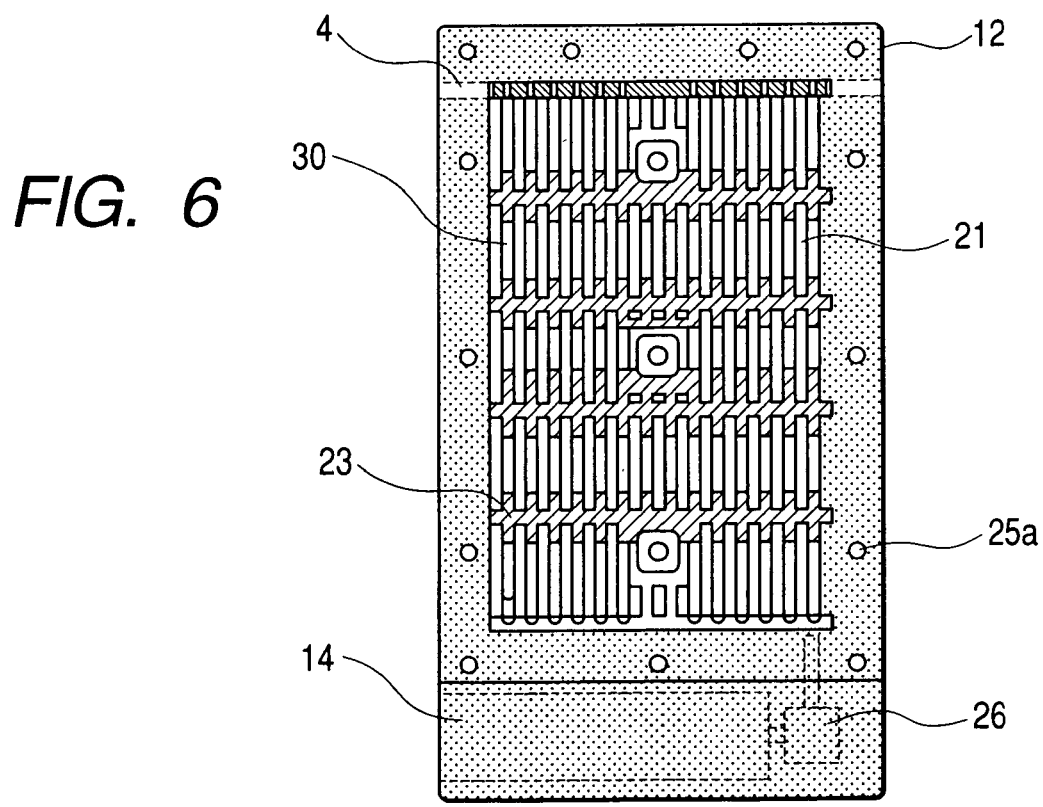
FIG. 6 shows an embodiment of an integrated configuration of a fuel chamber and an exhaust-gas discharge module according to the present invention.

FIG. 6 is a schematic view of a fuel chamber, which combines a fuel chamber 12 in FIG. 4 with an exhaust-gas discharge module 30 in FIG. 5, to be an embodiment according to the present invention. Each vapor-liquid separation tube 31 of the exhaust-gas discharge module 30 securely passes through a support hole 24 of the rib support plate 23 provided in the fuel chamber 12, and the module substrate 32 is connected to the exhaust-gas outlet 4 so as to discharge gas collected through each vapor-liquid separation tube 31 outside the fuel cell. In this configuration, vapor-liquid separation tubes can be installed at almost the same interval as the distance between two anodes which are opposite to each other near the anode on which carbon dioxide is generated. Thus, when the fuel cartridge is mounted, the fuel chamber is filled with fuel under a prescribed pressure, and when power generation is not being conducted, fuel cannot enter into the pores until the pressure reaches a specific level due to the water-repellent property of the vapor-liquid separation tube. Accordingly, fuel does not leak when the pressure is less than a specific level, and both gas dissolved in the fuel and carbon dioxide created at the start of power generation are collected through the vapor-liquid separation tubes and discharged outside the fuel cell due to the liquid fuel pressure. The film thickness, average pore size, pore distribution and aperture ratio of the vapor-liquid separation tube are specified according to the initial and final pressures of the fuel cartridge and the amount of carbon dioxide emission when the cell's output is at a maximum.

Figure 7:
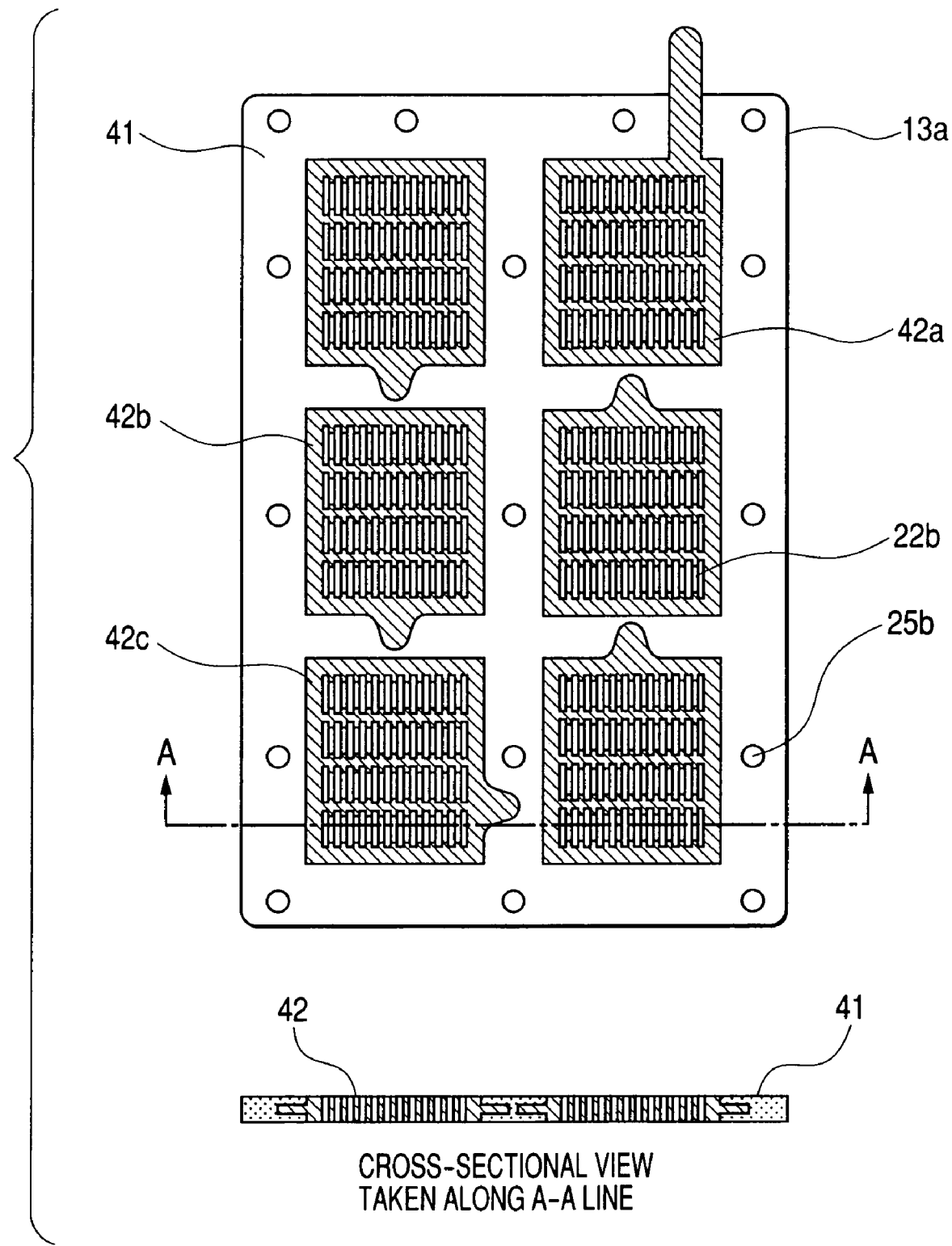
FIG. 7 shows an embodiment of an anode end plate according to the present invention.

FIG. 7 shows the configuration of an anode end plate 13a which is fit to the fuel chamber. Six single cells are disposed on one surface of the anode end plate 13a, and three current collectors 42a, 42b and 42c having electronic conductivity and corrosion resistance are integrated with an insulating sheet 41 to enable serial electrical connection, and each current collector has a plurality of slits 22b. The insulating sheet 41 has a plurality of screw holes 25b to fasten and integrate fuel cell components.

The insulating sheet 41 constituting an anode end plate 13a is not intended to be limited to a specific material; any material can be used as far as each current collector 42 disposed on the anode end plate 13a can be jointed to form an integrated configuration while maintaining insulation and planarity. High-density vinyl chloride, high-density polyethylene, high-density polypropylene, epoxy resin, polyether ether ketone, polyether sulfone, polycarbonate, polyimide type resin, or such materials reinforced with glass fiber can be used. Also, steel, nickel, and other light-weight aluminum or magnesium alloy material, or intermetallic compound, typified by copper-aluminum, and a variety of stainless steels can be used by applying techniques to make the surface of such material nonconductive or have insulating properties by the application of resin, thereby fitting the surface of the anode end plate 13a to the current collectors 42.

Figure 8:
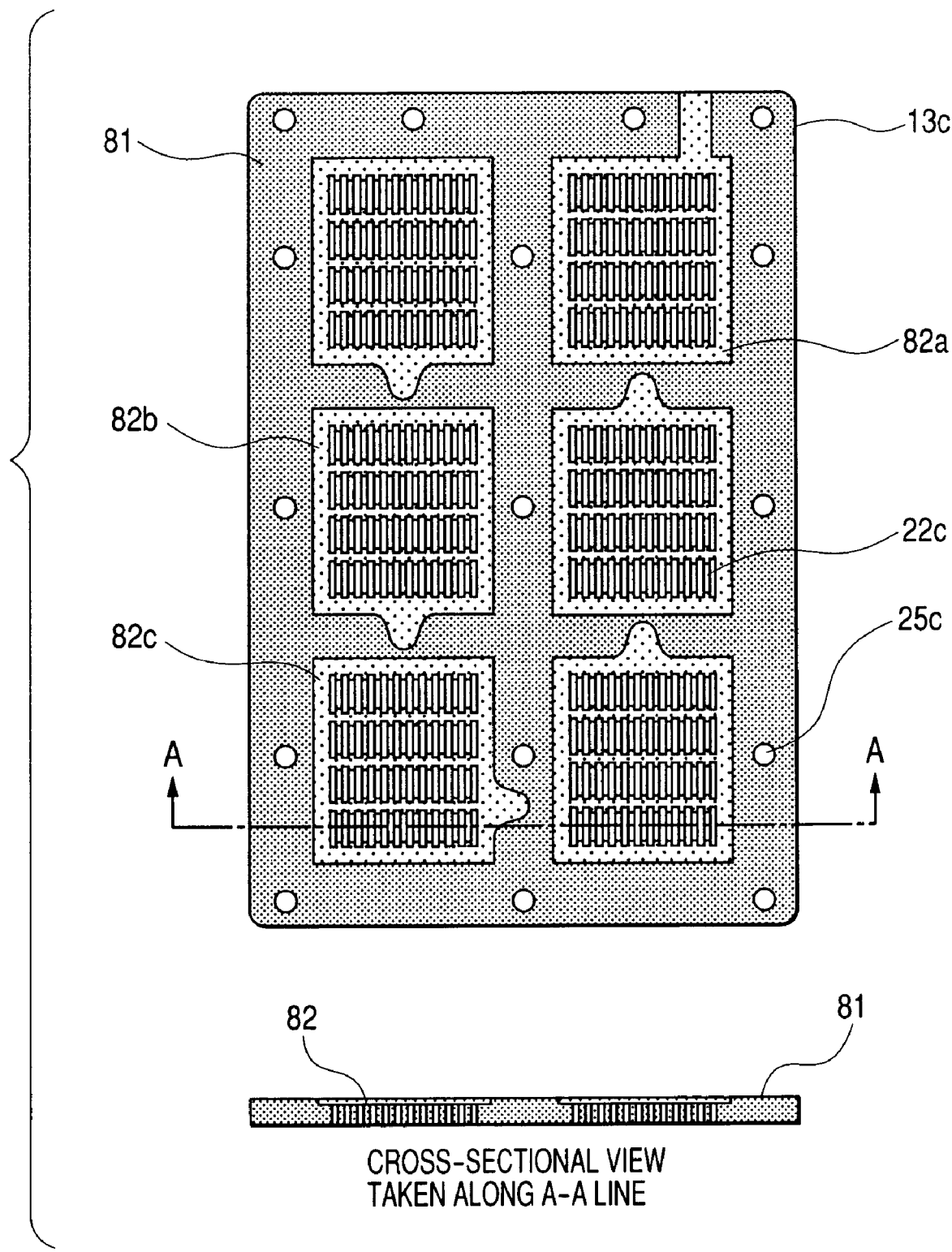
FIG. 8 shows an embodiment of a cathode end plate according to the present invention.

FIG. 8 shows an example of the configuration of the cathode end plate 13c on which a plurality of single cells are disposed in series. The cathode end plate 13c has countersunk sections 82a, 82b and 82c which receive a plurality of current collectors 42 to fit the current connectors to a substrate 81. In the countersunk section 82, slits 22c are provided to diffuse air used as an oxidizing agent and generated vapor. Screw holes 25c are also provided to integrate and fasten fuel cell components. Material for the substrate 81 is not intended to be limited to a specific material; any rigid material can be used as far as the current collectors 42 are able to be fitted and secured to the surface of the substrate 81 while ensuring insulation, planarity, and sufficiently low contact resistance to the MEAs. High-density vinyl chloride, high-density polyethylene, high-density polypropylene, epoxy resin, polyether ether ketone, polyether sulfone, polycarbonate, polyimide type resin, or such materials reinforced with glass fiber can be used. Also, steel, nickel, and other light-weight aluminum or magnesium alloy material, or, intermetallic compound, typified by copper-aluminum, and a variety of stainless steels can be used by applying techniques to make the surface of such material nonconductive or have insulating properties by the application of resin, thereby fitting the surface of the cathode end plate 13c to the current collectors 42.

Figure 9:
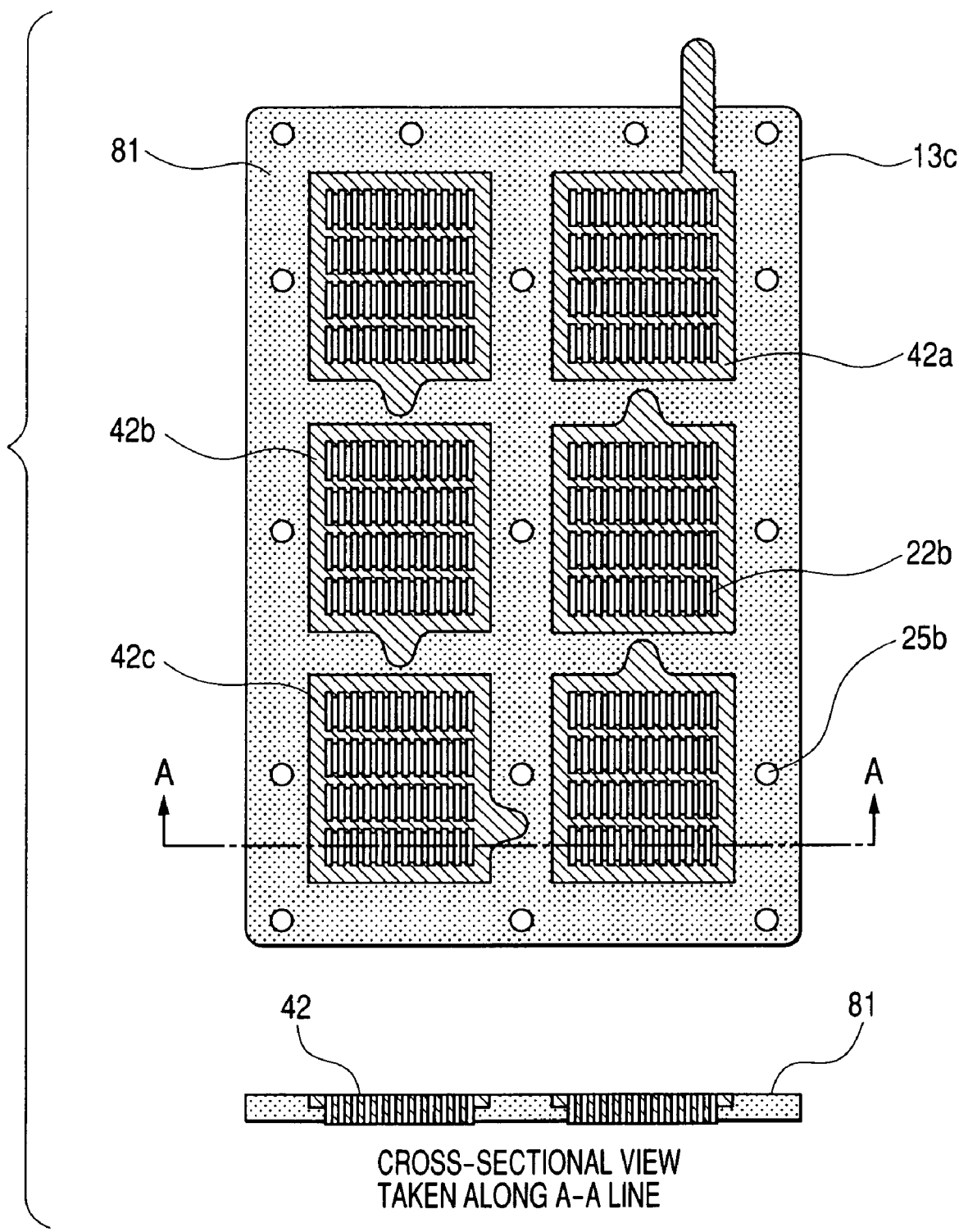
FIG. 9 shows an embodiment of an integrated configuration of a current collector and a cathode end plate according to the present invention.
Figure 10A:
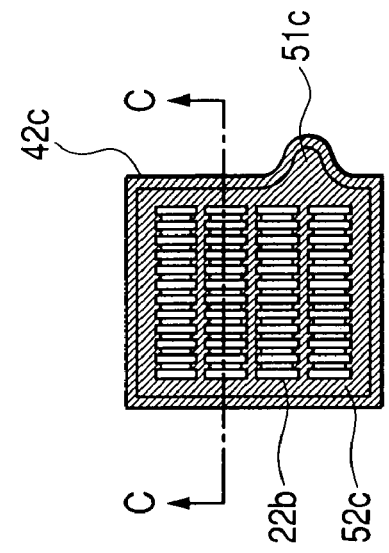
FIG. 10 shows an embodiment of an anode current collector according to an embodiment of the present invention.
Figure 10B:
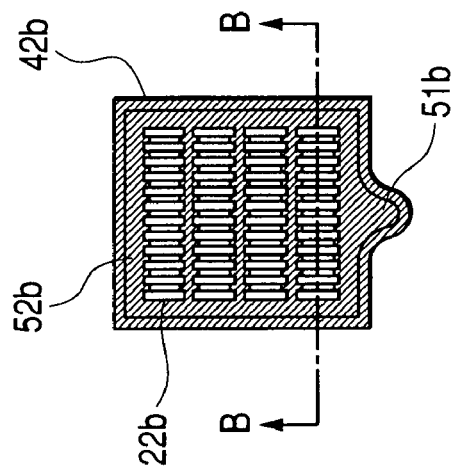
Figure 10C:
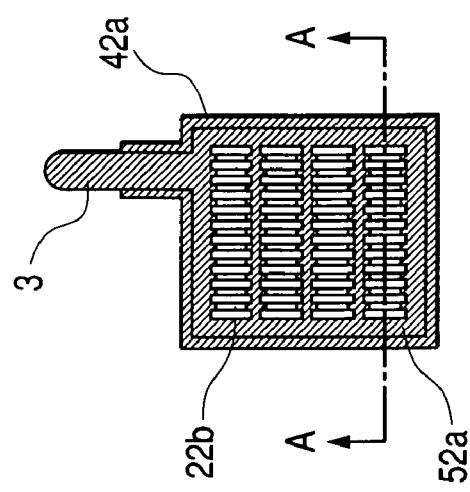
Figure 11A:
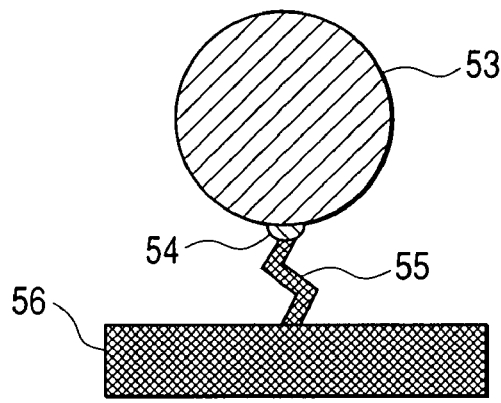
FIG. 11 shows schematic diagrams of structural models of a catalyst material according to the present invention.
Figure 11B:
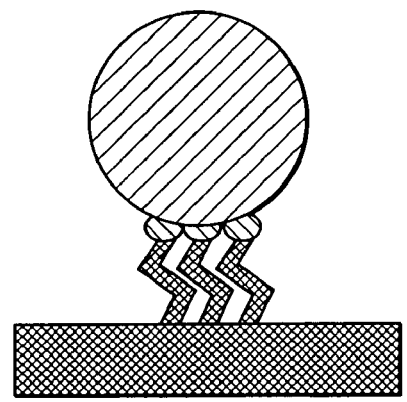
Figure 11C:
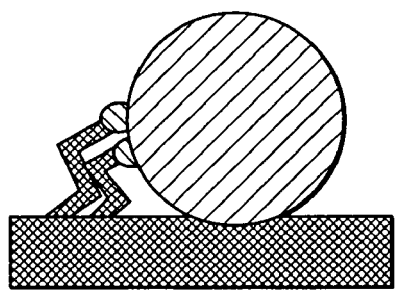
Figure 11D:
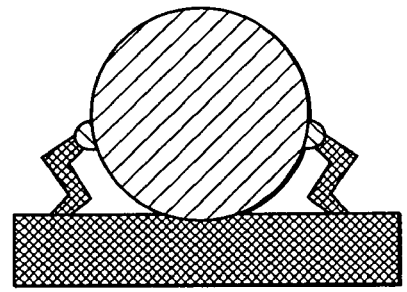

FIG. 9 is a schematic view of the cathode end plate 13c on which current collectors disclosed in FIG. 10 are fitted into the countersunk sections 82 of the substrate 81 shown in FIG. 8. On one surface of the cathode end plate 13c, six current collectors 42 are provided which come in contact with the cathode of six single cells to collect electricity, and also screw holes 25c are provided to integrate and fasten fuel cell components. It is preferable that the current collectors 42 be fitted into countersunk sections 82 and bonded with adhesives so that one flat surface can be formed together with the flange surface of the substrate 81. Any adhesive can be used as far as it does not dissolved nor swell when it comes in contact with a methanol solution and is more electrochemically stable than methanol. Epoxy resin type adhesives are the most suitable.

A fixing technique is not intended to be limited to the use of adhesives. For example, a protrusion can be provided in the countersunk section of the substrate 81 so as to engage the protrusion with a slit 22b in the current collector 42 or with a specially made hole. Furthermore, the current collectors 42 and one side of the substrate 81 do not necessarily form one flat surface. In the configuration in which a difference in level is created, current collectors 42 can be directly bonded onto the substrate 81 without providing countersunk sections 82. This configuration can be embodied by changing the structure and thickness of the gasket used for sealing purposes.

FIG. 10 shows the configuration of current collectors which are bonded on the anode end plate 13a and the cathode end plate 13c shown in FIGS. 7 and 9. Three types 42a, 42b and 42c of current collectors 42 which are different in shape are used to connect single cells in series on one flat surface. The current collector 42a is equipped with a cell's output terminal 3 and also has slits 22b on its surface to diffuse fuel or air used as an oxidizing agent. Each current collector 42b and 42c has an inter connector 51b and 51c to connect cells in series on each flat surface and also has slits 22b. Furthermore, when those current collectors 42 are disposed on the anode end plate 13a, fins 52 are provided to integrate and bond those current collectors 42 with the insulating sheet 41 disclosed in FIG. 7. On the contrary, when those current collectors 42 are disposed on the cathode end plate 13c, current collectors 42 having no fins 52 are applied.

Material for the current collector 42 is not intended to be limited to a specific material. Any metallic plate such as a carbon plate, stainless steel, titanium, and tantalum, or composite material which combines such metallic material with other metal such as carbon steel, stainless steel, copper or nickel cladding material, can be used. Furthermore, in the metallic current collector, it is effective to apply corrosion resistant rare metal, such as gold, or apply conductive carbon paint to the current collector's processed electrical contact portion so as to reduce contact resistance upon installation, thereby increasing the cell's output density and long-term performance stability.

As an anode catalyst constituting an MEA according to an embodiment of the present invention, a powdered carbon carrier which disperses and carries fine particles of platinum/ruthenium mixed metal or platinum/ruthenium alloy is easily produced and applied. As a cathode catalyst, a carbon carrier which disperses and carries fine platinum particles is easily produced and applied.

However, as is the case in a conventional technology, simply precipitating catalyst particles will cause particles to cohere to one another upon precipitation, resulting in catalyst metal particles which are rough and large and a reduced specific surface area. As a result, large volume of catalyst metal is necessary for obtaining sufficient activity.

Furthermore, the carried catalyst particles are not secured on the catalyst carrier and are unstable and easily moved. Accordingly, there is a technical problem in that as time goes by, catalyst particles gradually cohere to one another and the activity of the catalyst particles decrease.

Thus, herein, a highly active and stable catalyst material will be described which prevents catalyst particles from cohering to one another while the active metal surface is being exposed as large a area as possible. This can be done by covalently binding a functional group modified on the carbon carrier to the metal particle surface so as to securely fix metal particles onto the carrier surface.

FIG. 11[A] shows an example of an ideal structural model of the catalyst material according to an embodiment of the present invention. Herein, the catalyst material contains a catalyst metal particle 53, functional group 54 covalently bound to the catalyst metal particle 53, alkyl chain 55 having a functional group 54 modified on the carbon carrier which is a catalyst carrier, and a carbon carrier 56.

As shown in FIG. 11[A], the most preferred situation of the catalyst material is that only one functional group (a) is bound to the surface of the catalyst metal particle 53 and the remaining particle surface is entirely exposed. FIGS. 11[B] through [D] show expected structural models of the catalyst material other than the structural model shown in FIG. 11[A].

Figure 12A:
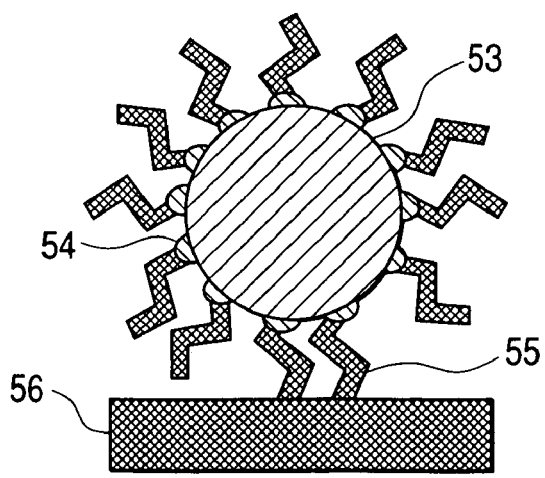
FIG. 12 shows schematic diagrams of structural models of a metal particle, the surface of which is covered with a compound, according to the present invention.
Figure 12B:
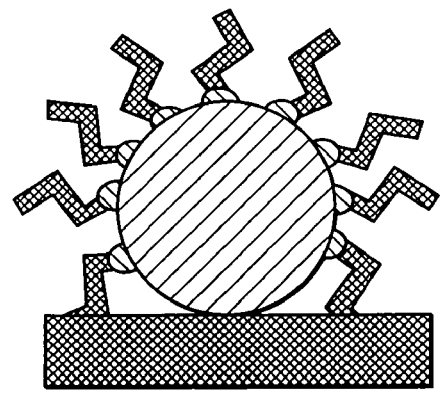

FIG. 11[B] shows a situation in which a plurality of functional groups (a) are bound to the metal particle. FIG. 11[C] shows a situation in which the functional groups (a) are bound to a part of the metal particle that directly adheres to the carbon carrier. And, FIG. 11[D] shows a situation in which the functional groups (a) are bound to the circumference of the metal particle that directly adheres to the carbon carrier. The exposed metal surface in FIGS. 11[B] through [D] is smaller than that in FIG. 11[A]; however, those configurations are more preferable in terms of stability. In the light of the stability, by coating the entire metal surface with a compound including the functional group (a) as shown in FIGS. 12[A] and [B], the compound functions as a stabilizing agent, thereby preventing the particles from cohering to one another. Consequently, it is possible to easily produce small particles and keep particles small.

However, by coating the entire metal surface, the active site which contributes to the reaction is covered due to the adsorption of the compound, resulting in a large decrease in the catalytic activity. Therefore, to increase both catalytic activity and stability, it is preferable that the configuration shown in FIG. 11 be created in which a part of the metal particle is bound to the functional group while the active metal surface is exposed maximum, thereby preventing particles from cohering to one another.

As the aforementioned functional group (a), any functional group that contains an element, such as sulfur, selenium, and tellurium, which is able to be covalently bound to a metal atom can be used. Preferred groups are a thiol group containing sulfur, disulfide group, selenol group containing selenium, diselenide group, tellurol group containing tellurium, and ditelluride group; and the most referred groups of all are the thiol group containing sulfur and disulfide group. The number of functional groups (a) is not intended to be limited to the specific number, but, if too many functional groups (a) are involved, the more metal surface is covered, causing the catalytic activity to decrease. Therefore, the preferred number of functional groups (a) is 1 to 5, and more preferred number of the groups is 1 or 2. In addition, location of the functional group (a) is not intended to be limited to a specific location, but, it is preferable that the functional group (a) be located at a position at which the group frequently comes in contact with a metal particle so that the functional group (a) easily binds covalently to the metal particle; that is, it is preferable that the functional group (a) be located at the end of the alkyl chain farthest from the surface of the carbon carrier. The amount of functional group (a) introduced varies according to the type of the functional group (a), carrier, and metal particle. In an example in which the thiol group containing sulfur is introduced as a functional group (a), if the amount of thiol group introduced is too much, an excess of the thiol group is adsorbed onto the metal particle surface causing the catalytic activity to decrease, and if the amount of thiol groups is not sufficient, the capability to secure metal particles may decrease, which seems to be a problem in terms of cohesion prevention. Accordingly, the amount of thiol group introduced is preferably as follows: a weight ratio of the sulfur atom to the total weight of the metal particle and sulfur atom is preferably 0.5 to 30 wt %, and more preferably 1 to 10 wt %.

The method considered to be appropriate for modifying the aforementioned functional group (a) on the carbon surface is to chemically bind the alkyl chain, which has the aforementioned functional group (a) on its end, to the surface functional group (b), such as a hydroxyl group, carbonyl group, carboxyl group, and aldehyde group, which originally exists on the surface of the carbon carrier. Type of the chemical bond is not intended to be limited to specific bond, but, it is preferable to use bond, such as ether bond, silyl-ether bond, or peptide bond, which is easily created in the liquid phase that enables synthesis in large quantities so as to modify the alkyl chain having the aforementioned functional group (a) on its end onto the carbon surface. Furthermore, it is possible to increase and decrease the amount of the surface functional group (b) by treating the carbon carrier surface. Methods to increase the surface functional group (b) include plasma treatment in a vacuum, and heating in an oxygen atmosphere, however the easiest method is to immerse the carbon carrier in a solution containing an oxidizing agent. Furthermore, to decrease the surface functional group (b), heating in an inactive gas or in a vacuum is most effective.

The size and shape of the carbon material used as a carrier is not intended to be limited; it can be a plate, bar, porous body, grain, or fiber. Common types of material are graphite, glassy carbon, carbon black, activated carbon, and carbon nanotube. However, to use a carbon material as a catalyst carrier, it is preferable to select a material having a large specific surface area. For example, a fine carbon particle, activated carbon, carbon black, porous carbon, and carbon nanotube are suitable. To use a carbon material as an electrode for a fuel cell, highly conductive material is required, such as highly conductive carbon black, porous carbon, and carbon nanotube.

A catalyst material according to this embodiment is characterized in that metal particles are fixed onto the carrier surface by covalently binding the functional group (a), which is modified on the carbon carrier as a catalyst carrier, to the metal particle surface. The covalent bond is the strongest bond of all chemical bonds, and the bonded metal particles strongly stick to the carbon material surface with a functional group interposed, thereby inhibiting particles from cohering to one another and making it possible to keep the size of the carried metal particles constant. The type of the metal particle which is used for the covalent bond is not intended to be limited to a specific type; and Pt, Ru, Pd, Rh, Ni, Cu, Ag, Au, and alloy of those elements can be used. However, when using the metal particle for fuel cells, especially when using it as a catalyst for the solid polymer type fuel cell at normal temperature, it is preferable that Pt or an alloy containing Pt be used because Pt has extremely high catalytic activity in the hydrogen or methanol oxidation and oxygen reduction. When using an alloy, the catalytic activity significantly varies according to the alloy composition; therefore, it is necessary to control the alloy composition so as to produce a highly active catalyst. As a catalyst for the DMFC fuel electrode, a Pt—Ru alloy which mixes Pt with Ru is generally used. However, if the ratio of Ru is too low, catalytic activity decreases due to poisoning by CO, and if the ratio of Ru is too high, the ratio of Pt which is active in methanol oxidation decreases, resulting in reduction of the current. Thus, with respect to the alloy composition of the catalyst for the DMFC fuel electrode, it is preferable that the weight ratio of Ru to the total weight of Pt and Ru be 30 to 90 wt %; more preferably 50 to 80 wt %.

Furthermore, as the metal particle size becomes smaller, the specific surface area increases, and therefore, the required amount of metal can be reduced. In particular, when the particle diameter becomes smaller than 10 nm, the specific surface area significantly increases. Accordingly, it is preferable that the diameter of the metal particle be 1 to 10 nm; more preferably 1 to 5 nm.

By using hydrogen ion conductive material for an electrolyte membrane, it is possible to achieve a stable fuel cell without being influenced by carbon dioxide in the atmosphere. Usable materials are: sulfonated fluoropolymer typified by polyperfluorostyrenesulfonic acid, polyperfluorocarbon sulfonic acid, etc.; sulfonated hydrocarbon polymer, such as polystyrenesulfonic acid, sulfonated polyether sulfone, sulfonated polyether ether ketone, etc., or alkyl-sulfonated hydrocarbon polymer. By using such material as an electrolyte membrane, it is generally possible to operate fuel cells at a temperature of 80° C. or lower. Furthermore, it is also possible to create fuel cells which can operate at higher temperatures by using a composite electrolyte membrane which micro-disperses hydrogen ion conducting inorganic substance, such as tungsten oxide hydrate, zirconium oxide hydrate, and tin oxide hydrate, into heat-resistant resin or sulfonated resin. The composite electrolyte membrane which uses sulfonated polyether sulfone, polyether ether sulfone, or hydrogen ion conducting inorganic substance is more preferable than the electrolyte membrane which uses polyperfluorocarbon sulfonic acid because in the former electrolyte membrane, a fuel's methanol permeability is low. At any rate, the use of an electrolyte membrane having high hydrogen ion conductivity and low methanol permeability increases fuel's efficiency to generate power. As a result, it is possible to achieve an increase in the amount of time and power can be generated in a compact body, which is the effect of this embodiment.

Figure 13A:
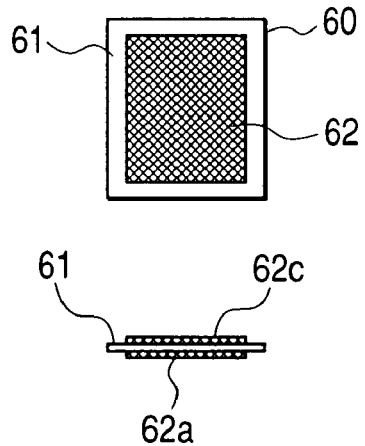
FIG. 13 shows an embodiment of an MEA and diffusion layer according to the present invention.

FIG. 13(a) shows the configuration of an MEA (membrane electrode assembly) 60 used for an embodiment of the present invention. Alkyl sulfonated polyether sulfone is used for an electrolyte membrane 61, platinum and ruthenium are used as a carbon carrier (XC72R: Cabot) for the anode electrode 62a, a platinum carrying catalyst is used as a carbon carrier (XC72R: Cabot) for the cathode electrode 62c, and as a binder, the same polymer as alkyl sulfonated polyether sulfone used for the electrolyte membrane but has smaller sulfone equivalent weight than the electrolyte membrane. By choosing such a binder, it is possible to make the amount of crossover of the electrolyte, which is water and methanol, dispersed on an electrode catalyst larger than the electrolyte membrane, thereby improving fuel diffusion on the electrode catalyst and increasing electrode performance.

Figure 13B:
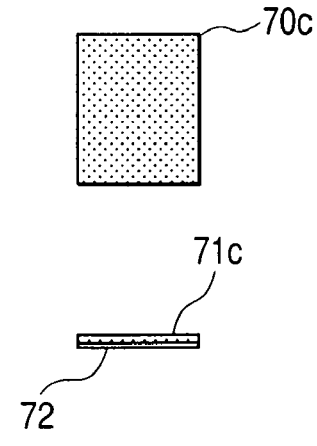
Figure 13C:
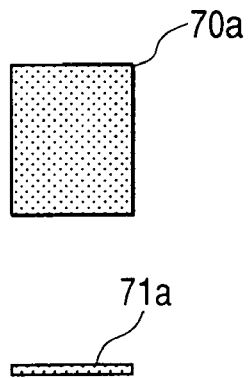

FIGS. 13(b) and 13(c) show the configuration of a cathode diffusion layer 70c and an anode diffusion layer 70a, respectively, used for the present invention. The cathode diffusion layer 70c consists of a water-repellent layer 72 which increases vapor pressure in the vicinity of the cathode by reinforcing the water-repellency, diffuses and discharges generated vapor, and prevents the cohesion of water particles, and a porous carbon substrate 71c. The water-repellent layer 72 is laminated so as to come in contact with the cathode electrode 62c. There are no restrictions as to the surface contact between the anode diffusion layer 70a and the anode electrode 62a, and a porous carbon substrate is used. A conductive and porous material is used for the porous carbon substrate 71c on the cathode diffusion layer 70c. Generally, carbon fiber woven cloth or nonwoven cloth is used. For example, carbon cloth (Torayca cloth: Toray Industries, Inc.) or carbon paper (Toray: TGP-H-060) is used as a carbon fiber woven cloth. The water-repellent layer 72 is created by mixing carbon powder with water-repellent fine particles, water-repellent fibril or water-repellent fiber, such as polytetrafluoroethylene, etc.

Specifically, the carbon paper (Toray: TGP-H-060) is first cut in the prescribed dimensions, and the amount of water absorption is calculated. After that, the carbon paper is immersed in the polytetrafluorocarbon/water dispersion (D-1: Daikin Industries, Ltd.) which has been diluted so that the weight ratio after the carbon paper is burned will become 20 to 60 wt %, dried at a temperature of 120° C. for one hour, and then burned in the air at temperatures between 270 and 360° C. for 0.5 to 1 hour. Next, the polytetrafluorocarbon/water dispersion is added to the burned substance and kneaded so that the weight ratio to the carbon powder (XC-72R: Cabot) will become 20 to 60 wt %. A coat of the paste-like kneaded mixture is applied to one side of the water-repellent carbon paper, as stated above, until the thickness of the coating becomes 10 to 30 μm. Then, this is dried at a temperature of 120° C. for an hour, dried at temperatures between 270 and 360° C. for 0.5 to 1 hour, and is then baked in the air, and finally a cathode diffusion layer 70c is created. The breathablity and moisture permeability of the cathode diffusion layer 70c, which is a diffusive property of supplied oxygen and generated water, greatly depends on the amount of added polytetrafluoroethylene, dispersibility, and burning temperature. Therefore, most appropriate conditions are selected by taking into consideration the designed performance of the fuel cell and use environment.

A woven or nonwoven cloth made of carbon fiber which is conductive and porous is suitable for the anode diffusion layer 70$a$. Specifically, carbon cloth (Torayca cloth: Toray) and carbon paper (Toray: TGP-H-060) are suitable. The anode diffusion layer 70$a$ has a function to promote aqueous fuel supply and quick dissipation of generated carbon dioxide. There are several effective methods to inhibit carbon dioxide generated on the anode from creating bubbles within the porous carbon substrate 71$a$ thereby increasing output density of the fuel cell. Those methods are: a method to make the surface of the aforementioned porous carbon substrate 71$a$ hydrophilic by means of moderate oxidation or ultraviolet ray radiation, a method to disperse hydrophilic property resin on the porous carbon substrate 71$a$, and a method to disperse and carry a substance having a strong hydrophilic property, typified by titanium oxide. Furthermore, the anode diffusion layer 70$a$ is not intended to be limited to the aforementioned material, and can be made of electrically and chemically inactive, porous metal material (e.g., stainless-steel fiber nonwoven cloth, porous body, porous titanium, tantalum, etc.).

Figure 14:
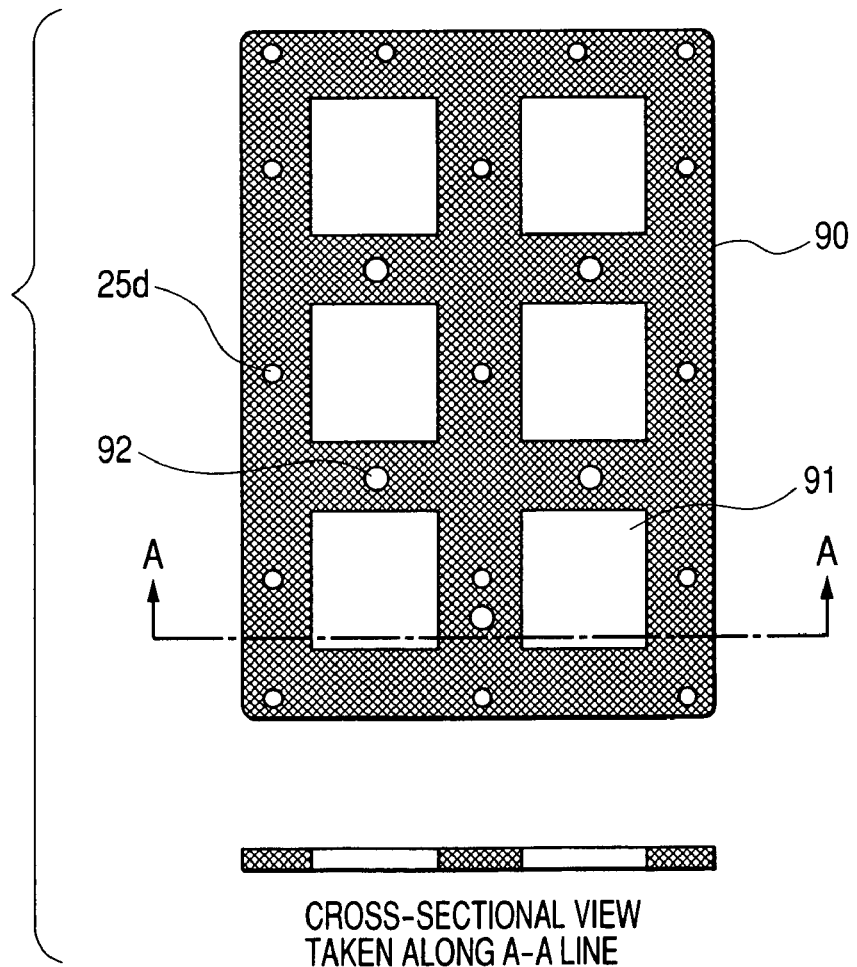
FIG. 14 shows an embodiment of a gasket according to the present invention.

FIG. 14 shows the configuration of a gasket 90 used for a fuel cell according to the present invention. The gasket 90 consists of completely cut-out electricity-carrying portions 91 which correspond to a plurality of MEAs mounted, a plurality of screw holes 25$d$ through which fastening screws pass, and a connection hole 92 through which passes a conductor that connects to the inter connector 51 of the anode end plate 13$a$ and the cathode end plate. The gasket 90 is designed to seal both fuel supplied to the anode electrode 62$a$ and oxidizing gas supplied to the cathode electrode 62$c$, and can be made of commonly used synthetic rubber such as EPDM, fluorinated rubber, or silicon rubber.

Hereafter, the above-mentioned catalyst material will be specifically explained by referring to the embodiments and a comparative example. In this embodiment, a platinum and ruthenium alloy is used as a catalyst metal; however, the catalyst metal is not intended to be limited to the platinum and ruthenium alloy, and a catalyst metal containing platinum can be used for the DMFC cathode.

[Embodiment 1]

Embodiment 1 is an example of a catalyst material for the DMFC electrode according to the present invention and a method of manufacturing the catalyst material. A carbon black particle (Cabot: Vulcan XC-72R) is used as a carbon carrier, platinum and ruthenium are used for carrying metal, and the thiol group is selected as a functional group covalently bound to the metal particle. An introduction method is as follows:

In process (a), a 0.5-mmol solution was created by adding mercapto-propyltrimethoxysilane (MPS) to 50 ml of ethanol and then 72 mg of carbon black was added to the 0.5-mmol solution. Next, this solution was stirred at a temperature of 70° C. for 2 hours while ultrasonic waves were radiated to create a reaction. After that, the solution was filtered, cleansed, and then dried at a temperature of 120° C. for 2 hours. Thus, the MPS-modified carbon black was obtained.

Next, in process (b), a Pt—Ru alloy particle was carried on the MPS-modified carbon black obtained in process (a). First, a dispersed solution was obtained by adding the MPS-modified carbon black in 300 ml of ethanol and stirring the mixture. Next, the temperature of the dispersed solution was kept 70° C., and then the $K_2PtCl_4$ solution and the $RuCl_3$ solution were added to the dispersed solution. The solution was then stirred for 4 hours to treat reduce $K_2PtCl_4$ and $RuCl_3$ with alcohol reduction, and the generated fine Pt—Ru particle was covalently bound to the thiol group on the MPS-modified carbon black. After that, the solution was filtered and cleansed with water, and finally Pt—Ru carrying carbon black was created. The obtained Pt—Ru carrying carbon black was observed by the TEM and a particle with a diameter of 2.5 nm was seen. As the result of the ICP mass spectrometry, the amount of carried Pt and Ru was 32 wt % and 20 wt %, respectively. Furthermore, MPS-modified carbon black measured by XPS before and after it carries Pt—Ru indicates that the peak of sulfur has shifted to the low-energy side after the carriage. This proved that the Pt—Ru particle has covalently bound to the thiol group on the carbon black. Also, the XPS measurements proved that the amount of introduced sulfur to the total weight of Pt—Ru and sulfur atoms was 1.6 wt %.

Next, characteristics of the anode-side catalyst for DMFC were evaluated by measuring the current-potential curve of the methanol oxidation. The popular method for evaluating a fuel-cell catalyst is to produce an electrolyte-membrane-electrode complex (MEA) and evaluate the fuel-cell catalyst. However, in this method, results greatly differ according to the production process, and catalytic activity is not always properly evaluated. Accordingly, this time, the following method was carried out to evaluate catalytic activity of the produced Pt—Ru carrying carbon black simple substance. First, 1.5 mol per litter of sulfuric acid solution and 98% methanol were mixed together to form a volume ratio of 3:1. A prescribed amount of the aforementioned Pt—Ru carrying carbon was added to the mixed solution, and ultrasonic waves were radiated thereby dispersing the solution. Next, the working electrode, counter electrode, and the reference electrode were put in the solution, and the solution was stirred and sufficiently degassed. After that, while stirring the solution and slowly sweeping the potential of the working electrode from 0 V (vs.NHE) to the plus level, catalytic activity of the Pt—Ru carrying carbon simple substance which had been dispersed in the solution was measured. In this method, only at the moment the Pt—Ru carrying carbon particle which has been dispersed in the solution comes in contact with the working electrode, the potential is applied thereby progressing an electrochemical reaction. By keeping the concentration of the Pt—Ru carrying carbon particle in the solution constant and making the probability of the Pt—Ru carrying carbon particle coming in contact with the working electrode equivalent, it is possible to evaluate relative activity of the catalyst particle simple substance created according to the value of the current which flowed through the working electrode. The result of measuring the Pt—Ru carrying carbon obtained in embodiment 1 by means of the aforementioned method verified that the current started flowing from a low potential, 0.4 V (vs.NHE), with the oxidation of methanol. Furthermore, the methanol oxidation current at 0.7 V (vs.NHE) was high, 3.6 mA (Table 1). Thus, it was verified that the Pt—Ru catalyst according to the present invention in which a Pt—Ru particle is fixed onto the carbon carrier by means of the covalent bond with the thiol group has excellent catalytic activity as a methanol oxidation catalyst for DMFC.

[Embodiments 2 and 3]

Embodiments 2 and 3 are the examples of the catalyst material for the DMFC electrode in which selenol and terenol are used as the functional group which are covalently bound to the metal particle. Other conditions than the functional group are the same as embodiment 1. Table 1 shows the evaluation results of the characteristics of embodiments 2 and 3. In both embodiments, the characteristics of the catalyst material were as excellent as embodiment 1, and it was verified that the catalyst material in which Pt—Ru particles are fixed onto the carrier surface by selenol and terenol has excellent catalytic activity as a methanol oxidation catalyst for DMFC.

[Embodiments 4 through 6]

Embodiments 4 through 6 are examples of the catalyst material for the DMFC electrode in which the length of the alkyl chain between the functional group and the carbon carrier is 1, 6, and 12, respectively. Other conditions than the length of the alkyl chain are the same as embodiment 1. Table 1 shows the evaluation results of the characteristics of embodiments 4 through 6. In those embodiments, the characteristics of the catalyst material were as excellent as embodiment 1.

[Embodiment 7]

Embodiment 7 is an example of the catalyst material for the DMFC electrode in which the length of the main alkyl chain is 6, and the thiol group is introduced as a sub chain, thereby the number of thiol groups amounting to three. Other conditions than the length of the alkyl chain and the number of thiol groups are the same as embodiment 1. Table 1 shows the evaluation results of the characteristics of embodiment 7. In this embodiment, the characteristics of the catalyst material were as excellent as embodiment 1.

[Embodiments 8 through 10]

Embodiments 8 through 10 are examples of the catalyst material for the DMFC electrode in which the length of the alkyl chain is 6, and double bond, oxygen atom, and oxygen and nitrogen atoms are introduced as the main chain. Other conditions than the length and type of the alkyl chain are the same as embodiment 1. Table 1 shows the evaluation results of the characteristics of embodiments 8 through 10. In those embodiments, the characteristics of the catalyst material were as excellent as embodiment 1, and it was verified that the catalyst material in which double bond, oxygen atom, and oxygen and nitrogen atoms are introduced as the main chain has excellent catalytic activity as a methanol oxidation catalyst for DMFC.

[Embodiments 11 and 12]

Embodiments 11 through 12 are examples of the catalyst material for the DMFC electrode in which the amount of introduced sulfur to the total weight of Pt—Ru and sulfur atoms is 1.2 wt % and 18 wt %, respectively. Other conditions than the amount of introduced sulfur are the same as embodiment 1. Table 1 shows the evaluation results of the characteristics of embodiments 11 and 12. In embodiment 11 in which the amount of introduced sulfur is 1.2 wt %, the characteristics of the catalyst material were as excellent as embodiment 1.

[Embodiments 13 and 14]

Embodiments 13 and 14 are examples of the catalyst material for the DMFC electrode in which the alkyl chain is bonded to the carbon black surface by the ether bond and peptide bond. Other conditions than the type of alkyl chain bond are the same as embodiment 1. Table 1 shows the evaluation results of the characteristics of embodiments 13 and 14. In both embodiments, the characteristics of the catalyst material were as excellent as embodiment 1, and it was verified that the catalyst material in those embodiments has excellent catalytic activity as a methanol oxidation catalyst for DMFC even if type of alkyl chain bond is changed.

[Embodiments 15 and 16]

Embodiments 15 and 16 are examples of the catalyst material for the DMFC electrode in which the carbon carrier is Ketchen black EC and BP2000. Other conditions than the type of carbon carrier are the same as embodiment 1. Table 1 shows the evaluation results of the characteristics of embodiments 15 and 16. In both embodiments, the characteristics of the catalyst material were as excellent as embodiment 1, and it was verified that the catalyst material in those embodiments has excellent catalytic activity as a methanol oxidation catalyst for DMFC even if type of carbon carrier is changed.

[Embodiments 17 and 18]

Embodiments 17 and 18 are examples of the catalyst material for the DMFC electrode in which reducing agents for Pt and Ru in process (b) are formaldehyde and sodium borohydride, respectively. Other conditions than the pH 10 solution used as a solvent are the same as embodiment 1. Table 1 shows the evaluation results of the characteristics of embodiments 17 and 18. In both embodiments, the characteristics of the catalyst material were as excellent as embodiment 1, and it was verified that the catalyst material according to the present invention has excellent catalytic activity as a methanol oxidation catalyst for DMFC even if the reducing agent is changed.

[Embodiments 19 through 21]

Embodiments 19 through 21 are examples of the catalyst material for the DMFC electrode in which the amount of carried Pt—Ru is 5 wt %, 20 wt %, and 65 wt % by changing the input amount in process (b). Other conditions than the amount of carried Pt—Ru are the same as embodiment 1. Table 1 shows the evaluation results of the characteristics of embodiments 19 through 21. In embodiment 20 in which the amount of carried Pt—Ru is 20 wt %, the activity was as excellent as embodiment 1.

[Embodiments 22 through 25]

Embodiments 22 through 25 are examples of the catalyst material for the DMFC electrode in which ratio (wt %) of carried Pt to Ru is 45:5, 25:25, 20:33, 10:40 by changing the ratio of the added $K_2PtCl_4$ solution and the $RuCl_3$ solution in process (b). Other conditions than the ratio of carried Pt to Ru are the same as embodiment 1. Table 1 shows the evaluation results of the characteristics of embodiments 22 through 25. Characteristics of the particle size and the amount of carriage were as excellent as embodiment 1.

COMPARATIVE EXAMPLE 1

Comparative example 1 is an example of the catalyst material in which carbon black (Cabot: Vulcan XC-72R), having an unmodified surface, carries Pt—Ru. The method to carry Pt and Ru is the same as embodiment 1. Table 1 shows the evaluation results of the characteristics. The characteristics of the amount of carriage and the ratio of the surface area were almost the same as embodiment 1, but the particle size was as large as 7.5 nm and methanol oxidation current was low, 1.7 mA.

TABLE 1

|  | Particle size (nm) | Amount of carried Pt/Ru (wt %) | Ratio of the effective surface area (%) | Methanol oxidation current (mA) |
| --- | --- | --- | --- | --- |
| Embodiment 1 | 2.0 | 32/20 | 56 | 3.6 |
| Embodiment 2 | 3.5 | 30/12 | 48 | 3.0 |
| Embodiment 3 | 4.0 | 28/10 | 47 | 2.8 |
| Embodiment 4 | 2.0 | 30/18 | 56 | 3.6 |
| Embodiment 5 | 2.5 | 32/18 | 52 | 3.2 |
| Embodiment 6 | 2.5 | 27/16 | 41 | 2.2 |

TABLE 1-continued

| | Particle size (nm) | Amount of carried Pt/Ru (wt %) | Ratio of the effective surface area (%) | Methanol oxidation current (mA) |
|---|---|---|---|---|
| Embodiment 7 | 2.0 | 30/15 | 36 | 2.7 |
| Embodiment 8 | 2.0 | 34/15 | 52 | 3.2 |
| Embodiment 9 | 2.5 | 30/18 | 50 | 3.1 |
| Embodiment 10 | 2.5 | 31/15 | 53 | 3.4 |
| Embodiment 11 | 3.9 | 32/20 | 52 | 3.0 |
| Embodiment 12 | 2.1 | 32/20 | 32 | 2.5 |
| Embodiment 13 | 2.0 | 28/16 | 55 | 3.6 |
| Embodiment 14 | 2.0 | 30/15 | 52 | 3.3 |
| Embodiment 15 | 2.0 | 30/18 | 49 | 3.0 |
| Embodiment 16 | 2.5 | 29/18 | 53 | 3.2 |
| Embodiment 17 | 2.0 | 33/18 | 55 | 3.5 |
| Embodiment 18 | 2.0 | 36/20 | 56 | 3.6 |
| Embodiment 19 | 2.5 | 3/2 | 55 | 1.4 |
| Embodiment 20 | 2.0 | 13/7 | 54 | 3.0 |
| Embodiment 21 | 5.0 | 42/23 | 48 | 2.4 |
| Embodiment 22 | 2.2 | 45/5 | 56 | 1.2 |
| Embodiment 23 | 1.9 | 25/25 | 48 | 3.9 |
| Embodiment 24 | 1.7 | 20/33 | 52 | 4.5 |
| Embodiment 25 | 2.0 | 10/40 | 55 | 2.8 |
| Comparative example 1 | 7.5 | 30/19 | 48 | 1.7 |

[Embodiment 26]

Figure 15:
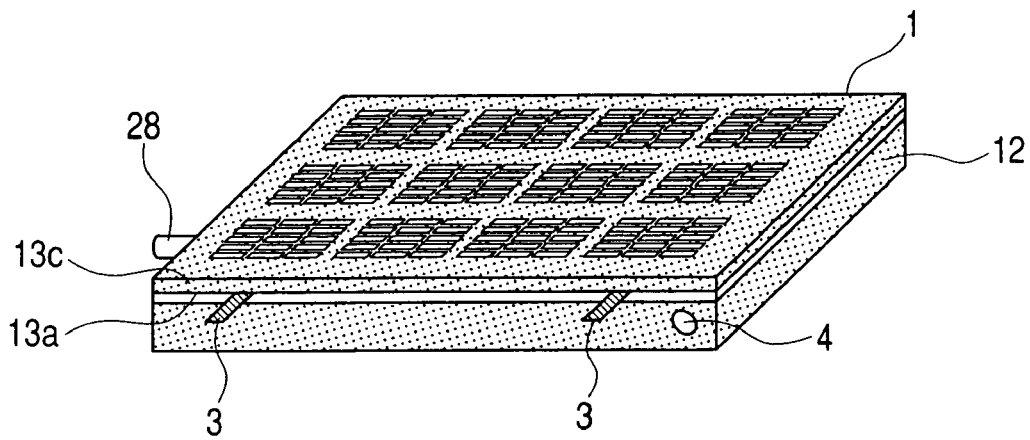
FIG. 15 is a schematic view of a fuel cell according to an embodiment of the present invention.

Hereafter, an embodiment of a DMFC for a mobile information terminal will be described. FIG. 15 is a schematic view of a DMFC according to the present invention. The fuel cell 1 has a fuel chamber 12; MEA, not shown, which uses sulfomethylated polyether sulfone as an electrolyte membrane; and a cathode end plate 13c and an anode end plate 13a, between which is a gasket, and the power generating portion is installed only on one side of the fuel chamber 12. A fuel supply tube 28 and an exhaust-gas outlet 4 are provided on the outer circumference of the fuel chamber 12. Furthermore, a pair of output terminals 3 is provided on the outer circumference of the anode end plate 13a and the cathode end plate 13c. The fuel cell assembly is the same as that in FIG. 2; however, there are two differences: a power generating portion is installed only on one side of the fuel chamber and the fuel cartridge holder is not integrated into the assembly. Material for the fuel chamber 12 is high-pressure vinyl chloride, the anode end plate is made of a polyimide resin film, and the cathode end plate is made of glass fiber reinforced epoxy resin.

Figure 16:
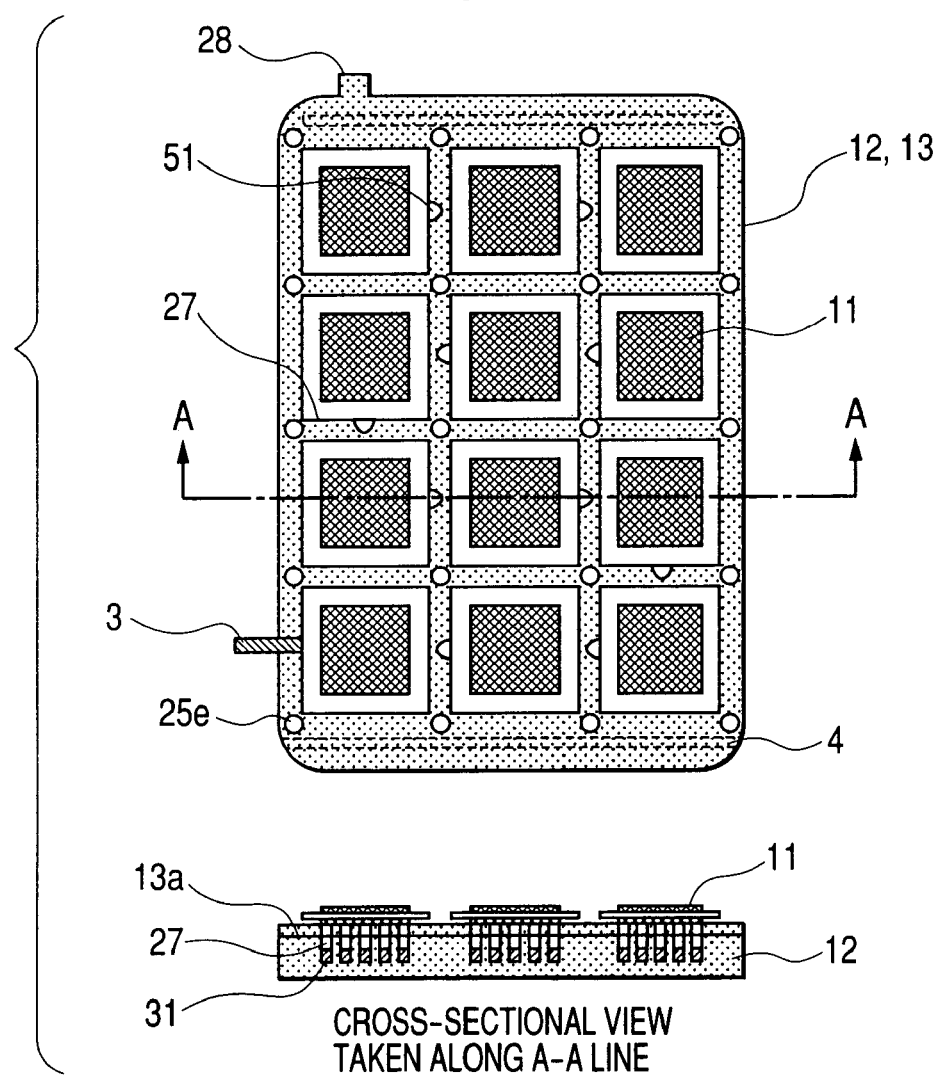
FIG. 16 shows an embodiment of an integrated configuration of a fuel chamber and an anode end plate, according to the present invention, in which an MEA is incorporated.
Figure 17:
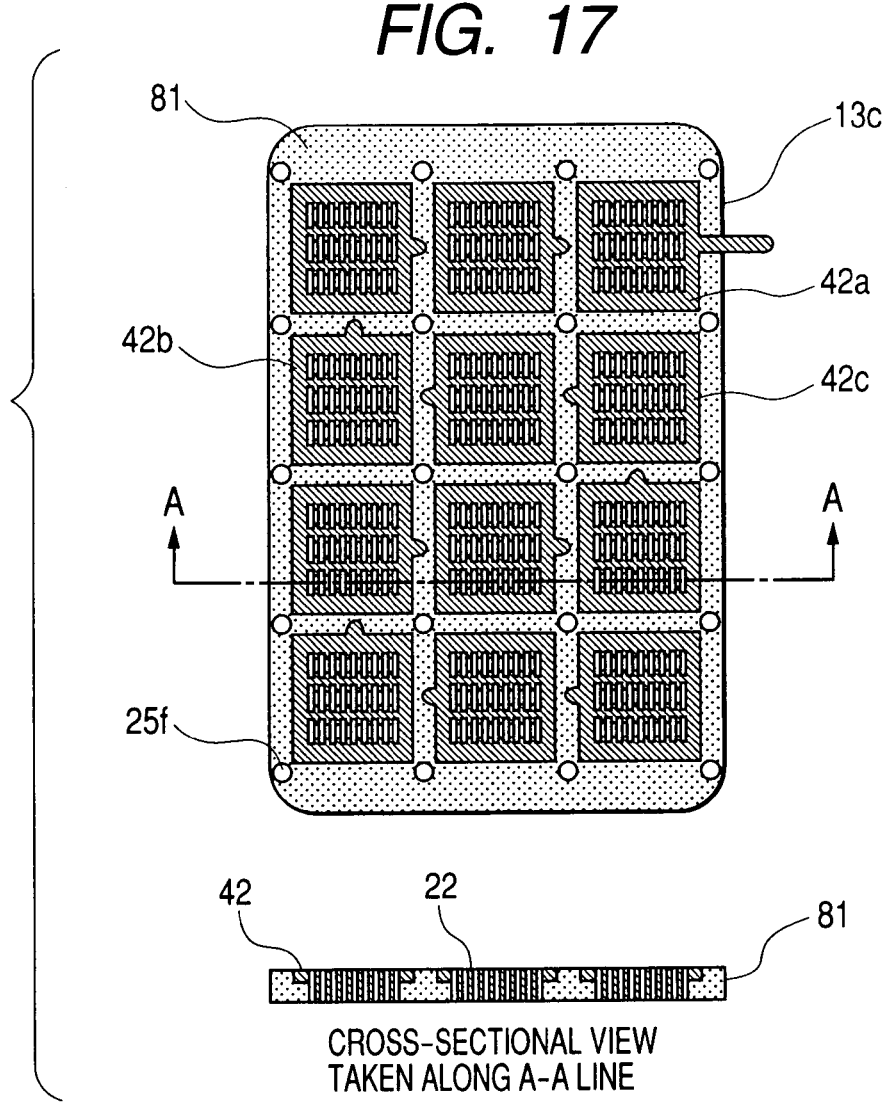
FIG. 17 shows an embodiment of a cathode end plate having a current collector according to the present invention.

FIG. 16 shows the layout of the installed MEAs and the sectional view. On this DMFC, twelve 22 mm×24 mm MEAs, each having a power generating portion of 16 mm×18 mm, are installed in the slits on the surface of the anode end plate 13a which is integrated with the fuel chamber 12. As shown in a cross-sectional view taken along A—A line in FIG. 14, a vapor-liquid separation module combined with a vapor-liquid separation tube 31 is inserted into a fuel distribution groove 27 provided in the fuel chamber 12. One end of the vapor-liquid separation module is connected to an exhaust-gas outlet 4. The other end of the fuel distribution groove 27 is connected to a fuel supply tube 28 located on the outer circumference of the fuel chamber 12. A current collector, not shown in FIG. 14, adheres to the outer surface of the anode end plate 13a so as to create an extended flat surface with the anode end plate surface. An inter connector 51 for connecting single cells in series and an output terminal 3 are disposed.

A 0.3-mm thick titanium plate is used for the current collector, and the surface which comes in contact with the electrode is cleansed and treated with 0.1-µm thick gold evaporation process. FIG. 15 shows the configuration of the cathode end plate 13c on which MEAs are fixed and cells are connected in series. A 2.5 mm thick glass-fiber reinforced epoxy resin plate is used as a substrate 81 for the cathode end plate 13c. The 0.3 mm thick titanium current collectors 42a, 42b and 42c, which are treated with gold evaporation process as stated above, are bonded by epoxy resin onto the surface of the above-mentioned plate. The substrate 81 and the current collector 40 have slits 22 for air diffusion, and they are bonded so as to communicate with each other.

The size of the created power source is 115 mm×90 mm×9 mm. Furthermore, by using a catalyst material according to embodiment 1 for the MEAs which constitute the power generating portion of the DMFC incorporated into the power source, a higher output can be obtained when compared with the output using conventional DMFCs.

[Embodiment 27]

Figure 18:
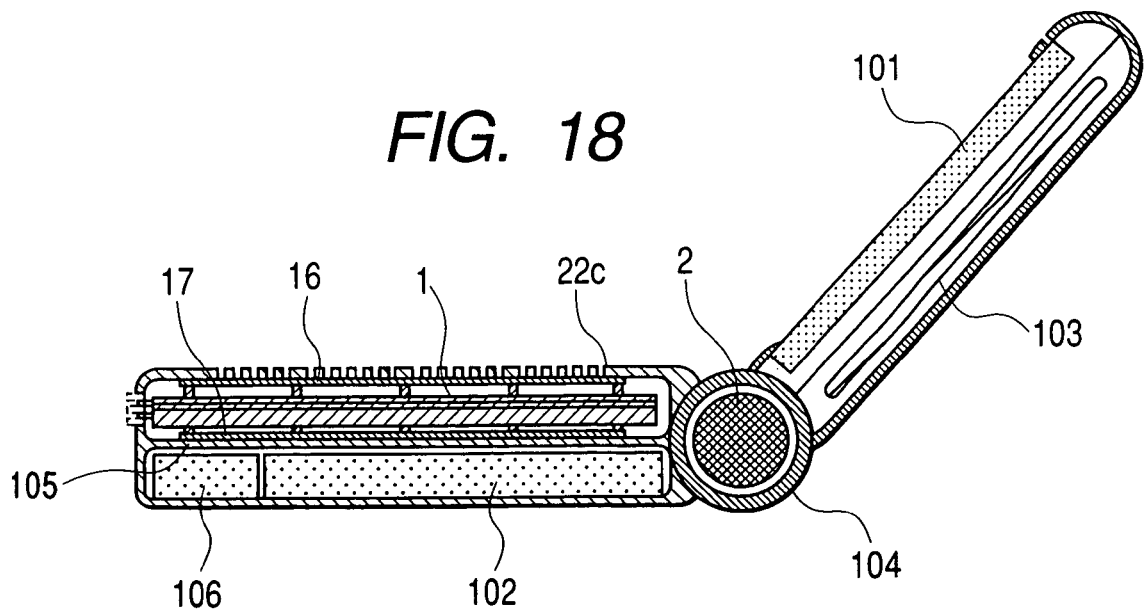
FIG. 18 shows an embodiment of a mobile information terminal equipped with a fuel cell according to the present invention.

FIG. 18 shows an example in which the DMFC created in embodiment 26 is installed in a mobile information terminal. This mobile information terminal has a display unit 101 which is integrated with the touch-panel input unit; a built-in antenna 103; and a main board 102 on which fuel cell 1, electronic devices, such as a processor, volatile and non-volatile memories, power control unit, hybrid controller for fuel cell and secondary cell, fuel monitor, etc., and electronic circuits are installed; and a portion for loading a lithium-ion secondary battery 106 is linked with a hinge 104 having a cartridge holder which also functions as a fuel cartridge 2 holder so that the mobile information terminal can be folded.

The power-source loading portion is divided into two portions by the partition wall 105; the main board 102 and lithium-ion secondary cells 106 are contained at the lower portion and fuel cells 1 are installed at the upper portion. Slits 22c are provided on the top surface and side wall of the chassis to diffuse air and battery exhaust gas. An air filter 107 is provided on the surface of the slit 22c in the chassis, and water-absorbing quick dry material 108 is provided on the surface of the partition wall. There are no restrictions as to the kind of air filter material to be used providing that it has high, gas-diffusive properties and adequately filters out dust. A mesh or woven synthetic resin single yarn can be used as filter material without becoming clogged. In this embodiment, highly water-repellent polytetrafluoroethylene single yarn mesh is used.

By using a catalyst material according to embodiment 1 for the MEA that constitutes the power generating portion of the DMFC incorporated into the mobile information terminal, a higher output can be obtained when compared with the output using conventional DMFCs. As a result, the maximum output that a mobile information terminal can request can be increased.

By using a catalyst material according to the present invention for a fuel cell, it is possible to prevent catalyst particles from cohering to one another and provide a fuel cell having high power density.

What is claimed is:

1. An electrolyte-membrane-electrode complex using a catalyst material, which has been created by carrying out
   the step of modifying the surface of a carbon material with functional groups, and
   the step of bonding catalyst metal particles to the functional groups by covalent bonds, as a catalytic layer for an electrode.

2. A fuel cell incorporating an electrolyte-membrane-electrode complex which uses a catalyst material, which has been created by carrying out the step of modifying the surface of a carbon material with functional groups, and the step of bonding catalyst metal particles to the functional groups by covalent bonds, as a catalytic layer for an electrode.

3. An electrolyte-membrane-electrode complex with a catalyst material comprising a catalyst carrier and a catalyst metal carried on the catalyst carrier, said catalyst carrier being made of a carbon material, wherein the catalyst carrier has functional groups for forming covalent bonds with the catalyst metal, wherein the catalyst metal is fixed to the catalyst carrier by the covalent bonds, and wherein the functional groups are selected from the group consisting of thiol groups, disulfide groups, selenol groups, diselenide groups, tellurol groups and ditelluride groups, as a catalytic layer for an electrode.

4. The electrolyte-membrane-electrode complex according to claim 3, wherein the carbon material is a member selected from the group consisting of graphite, glassy carbon, carbon black, activated carbon and carbon nanotube.

5. The electrolyte-membrane-electrode complex according to claim 3, wherein the catalyst metal is in the form of particles thereof, each particle of catalyst having one to five functional groups covalently bonded thereto.

6. The electrolyte-membrane-electrode complex according to claim 3, wherein said catalyst carrier, of carbon material, has alkyl chains extending therefrom, and said functional groups are located at ends of the alkyl chains farthest from the catalyst carrier.

7. The electrolyte-membrane-electrode complex according to claim 6, wherein the alkyl chains are chemically bonded to the catalyst carrier.

8. The electrolyte-membrane-electrode complex according to claim 3, wherein said catalyst metal is selected from the group consisting of Pt, Ru, Pd, Rh, Ni, Cu, Ag, Au and alloys thereof.

9. The electrolyte-membrane-electrode complex according to claim 3, wherein said catalyst metal is in the form of catalyst metal particles.

10. A fuel cell incorporating an electrolyte-membrane-electrode complex which uses a catalyst material comprising a catalyst carrier and a catalyst metal carried on the catalyst carrier, said catalyst carrier being made of a carbon material, wherein the catalyst carrier has functional groups for forming covalent bonds with the catalyst metal, wherein the catalyst metal is fixed to the catalyst carrier by the covalent bonds, and wherein the functional groups are selected from the group consisting of thiol groups, disulfide groups, selenol groups, diselenide groups, tellurol groups and ditelluride groups, as an electrode catalytic layer.

11. A fuel cell according to claim 10, wherein hydrogen and/or hydrocarbon compound is used as a fuel.

12. The fuel cell according to claim 10, wherein the carbon material is a member selected from the group consisting of graphite, glassy carbon, carbon black, activated carbon and carbon nanotube.

13. The fuel cell according to claim 10, wherein the catalyst metal is in the form of catalyst metal particles.

14. The fuel cell according to claim 10, wherein the catalyst metal is selected from the group consisting of Pt, Ru, Pd, Rh, Ni, Cu, Ag, Au and alloys thereof.

15. A fuel cell comprising:

an anode for oxidizing a fuel;

a cathode for reducing oxygen; and an electrolyte membrane created between said anode and said cathode, wherein at least one of said anode and said cathode has a catalyst material comprising a catalyst carrier and a catalyst metal carried on the catalyst carrier, said catalyst carrier being made of a carbon material, wherein the catalyst carrier has functional groups for forming covalent bonds with the catalyst metal, wherein the catalyst metal is fixed to the catalyst carrier by the covalent bonds, and wherein the functional groups are selected from the group consisting of thiol groups, disulfide groups, selenol groups, diselenide groups, tellurol groups and ditelluride groups.

* * * * *